United States Patent
Sasaki et al.

(10) Patent No.: US 8,424,965 B2
(45) Date of Patent: Apr. 23, 2013

(54) CLUTCH MECHANISM

(75) Inventors: Atsuki Sasaki, Nagoya (JP); Kouji Kaneda, Toyota (JP); Kei Matsui, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 478 days.

(21) Appl. No.: 12/666,315

(22) PCT Filed: Dec. 19, 2007

(86) PCT No.: PCT/JP2007/074418
§ 371 (c)(1),
(2), (4) Date: Mar. 4, 2010

(87) PCT Pub. No.: WO2009/001491
PCT Pub. Date: Dec. 31, 2008

(65) Prior Publication Data
US 2010/0187875 A1    Jul. 29, 2010

(30) Foreign Application Priority Data

Jun. 27, 2007   (JP) .................................. 2007-168923

(51) Int. Cl.
*B60N 2/42* (2006.01)
(52) U.S. Cl.
USPC ............ 297/216.12; 297/216.13; 297/216.14; 297/391; 297/406; 297/409
(58) Field of Classification Search .................. 297/391, 297/408, 409, 216.12–216.14
See application file for complete search history.

(56) References Cited

U.S. PATENT DOCUMENTS

| | | | |
|---|---|---|---|
| 6,024,406 A | 2/2000 | Charras et al. | |
| 6,523,892 B1 * | 2/2003 | Kage et al. | 297/216.13 |
| 6,779,840 B1 * | 8/2004 | Farquhar et al. | 297/216.12 |
| 7,185,950 B2 * | 3/2007 | Pettersson et al. | 297/216.12 |
| 7,644,987 B2 * | 1/2010 | Humer et al. | 297/216.12 |
| 7,963,599 B2 * | 6/2011 | Omori et al. | 297/216.12 |
| 7,967,380 B2 * | 6/2011 | Omori et al. | 297/284.4 |
| 2003/0160481 A1 * | 8/2003 | Veine et al. | 297/216.12 |
| 2009/0126520 A1 | 5/2009 | Yamaguchi et al. | |
| 2010/0060048 A1 | 3/2010 | Otsuka | |
| 2010/0060049 A1 | 3/2010 | Otsuka | |

FOREIGN PATENT DOCUMENTS

| | | |
|---|---|---|
| DE | 10232017 | 9/2003 |
| JP | 11-70828 | 3/1999 |
| JP | 2003-159972 | 6/2003 |

(Continued)

*Primary Examiner* — Laurie Cranmer
(74) *Attorney, Agent, or Firm* — Greenblum & Bernstein, P.L.C.

(57) ABSTRACT

A clutch mechanism in which a pressure receiving member is attached to two side frames of a seat back of a vehicle seat so as to be rotatable about rotation axes extending in a widthwise direction and in which when the pressure receiving member is rotated by a pressing load of an passenger sitting on the vehicle seat, the pressing load is selectively transmitted to an operation bracket pivotally connected to the rotation axes such that the operation bracket is rotated in the same direction as the pressure receiving member. When the pressure receiving member receives a quick pressing load, the operation bracket rotates while being mechanically integrated with the pressure receiving member, so that the pressing load can be transmitted to the operation bracket. When the pressure receiving member receives a slow pressing load, the operation bracket does not rotate, and only the pressure receiving member rotates, so that the transmission of the pressing load can be blocked.

1 Claim, 10 Drawing Sheets

FOREIGN PATENT DOCUMENTS

| | | |
|---|---|---|
| JP | 2004-316885 | 11/2004 |
| JP | 2005-271861 | 10/2005 |
| JP | 2006-82773 | 3/2006 |
| JP | 2006-327343 | 12/2006 |
| JP | 2006-341804 | 12/2006 |
| JP | 2007-83937 | 4/2007 |
| JP | 2007-83939 | 4/2007 |
| JP | 2007-290466 | 11/2007 |
| WO | 2007/007850 | 1/2007 |

* cited by examiner

CLUTCH MECHANISM

TECHNICAL FIELD

The present invention relates to a clutch mechanism. More specifically, the present invention relates to a clutch mechanism that is capable of selectively transmitting a pressing load to an operation bracket.

BACKGROUND ART

A clutch mechanism of this type is already known and is described in, for example, the specification of German Patent No. 10232017. In this technique, a clutch mechanism is constructed to function when a pressing load is applied to a seat back from a passenger sitting on a vehicle seat. Further, the clutch mechanism is constructed to transmit the pressing load to a lock mechanism capable of maintaining a use condition of a headrest only when the pressing load is applied to the seat back quickly. Thus, when the pressing load is applied to the seat back quickly, the lock mechanism is unlocked by the pressing load. As a result, the headrest can be tilted forwardly.

However, the known clutch mechanism described above is constructed such that the pressing load can be transmit to the lock mechanism via air. Therefore, even when the pressing load is applied to the lock mechanism quickly, the pressing load may not be transmitted to the lock mechanism depending on an ambient temperature.

Thus, there is a need in the art to provide a temperature-independent clutch mechanism which is capable of properly selectively transmitting a pressing load.

SUMMARY OF THE INVENTION

The present invention provides a clutch mechanism in which a pressure receiving member is attached to two side frames of a seat back of a vehicle seat so as to be rotatable about rotation axes extending in a widthwise direction and in which when the pressure receiving member is rotated by a pressing load of an passenger sitting on the vehicle seat, the pressing load is selectively transmitted to an operation bracket pivotally connected to the rotation axes such that the operation bracket is rotated in the same direction as the pressure receiving member. When the pressure receiving member receives a quick pressing load, the operation bracket rotates while being mechanically integrated with the pressure receiving member, so that the pressing load can be transmitted to the operation bracket. When the pressure receiving member receives a slow pressing load, the operation bracket does not rotate, and only the pressure receiving member rotates, so that the transmission of the pressing load can be blocked.

According to this construction, unlike in the prior art, the pressing load can be transmitted to the operation bracket without air. Therefore, the pressing load of the passenger can be reliably transmitted to the operation bracket without being affected by an ambient temperature.

Further, the pressure receiving member is a bar-like member of which the central portion is cranked. The pressure receiving member are rotatably attached to the two side frames at both end portions that functions as the rotation axes. An arm is integrally attached to one of the rotation axes so as to extend in a crosswise direction with respect to one of the rotation axes. The arm has an elongated hole extending in a longitudinal direction. One longitudinal wall surface of the elongated hole is formed as a flat surface, and the other longitudinal wall surface thereof is formed as a toothed surface. The operation bracket is a sector-shaped plate member having a sector surface. One of corner portions of the sector surface is pivotally connected to one of the rotation axes of the pressure receiving member such that the operation bracket is positioned ahead of the pressure receiving member. A pendulum member is attached to a central portion of the sector surface so as to be rotatable about an axis extending in a direction perpendicular to the sector surface. The pendulum member is biased forwardly. An elongated hole is formed in the sector surface so as to extend along a circular arc thereof. A pin capable of being inserted into the elongated holes of the operation bracket and the arm is formed in a free end portion of the pendulum member. When the pressure receiving member receives a quick pressing load, the arm rotates together with the pressure receiving member. Upon rotation of the arm, the pin of the pendulum member moves from one ends of the two elongated holes of the operation bracket and the arm toward the other ends thereof, and engages the toothed surface of the arm during the movement, so that the operation bracket is immobilized relative to the arm via the pin. Upon immobilization of the operation bracket, the operation bracket is capable of rotating together with the arm, so that the pressing load is transmitted to the operation bracket. When the pressure receiving member receives a slow pressing load, the arm rotates together with the pressure receiving member. Upon rotation of the arm, the pin of the pendulum member moves from one ends of the two elongated holes of the operation bracket and the arm to the other ends thereof and as a result, the operation bracket does not rotate, and only the pressure receiving member rotates, so that the transmission of the pressing load is blocked.

According to this construction, the clutch mechanism is constructed of the pressure receiving member, the operation bracket, the arm and the pendulum member. Therefore, the clutch mechanism can be simplified.

Further, a headrest is attached to the seat back of the vehicle seat. A main body of the headrest or a support plate supporting a head of the passenger is capable of projecting forwardly. The main body or the support plate is normally prevented from projecting forwardly by a lock mechanism. The lock mechanism and the operation bracket are connected to each other via an operation cable. When the pressing load is transmitted to the operation bracket, the cable member is pulled and as a result, the lock mechanism is unlocked, so that the main body or the support plate of the headrest can project forwardly.

According to this construction, the pressing load of the passenger can be transmitted to the lock mechanism of the headrest via the clutch mechanism. Therefore, when a back-side collision of a vehicle happens, the back of the head of the passenger can be instantaneously supported by the support plate of the headrest.

BEST MODE FOR CARRYING OUT THE INVENTION

In the following, a best mode for carrying out the present invention will be described with reference to FIGS. 1 to 10. Further, in FIGS. 1 to 5, in order to clearly show inner structures of a seat back 20 and a headrest 30, only inner frame structures are shown and cushion structures and cover structures are omitted.

Figure 1:
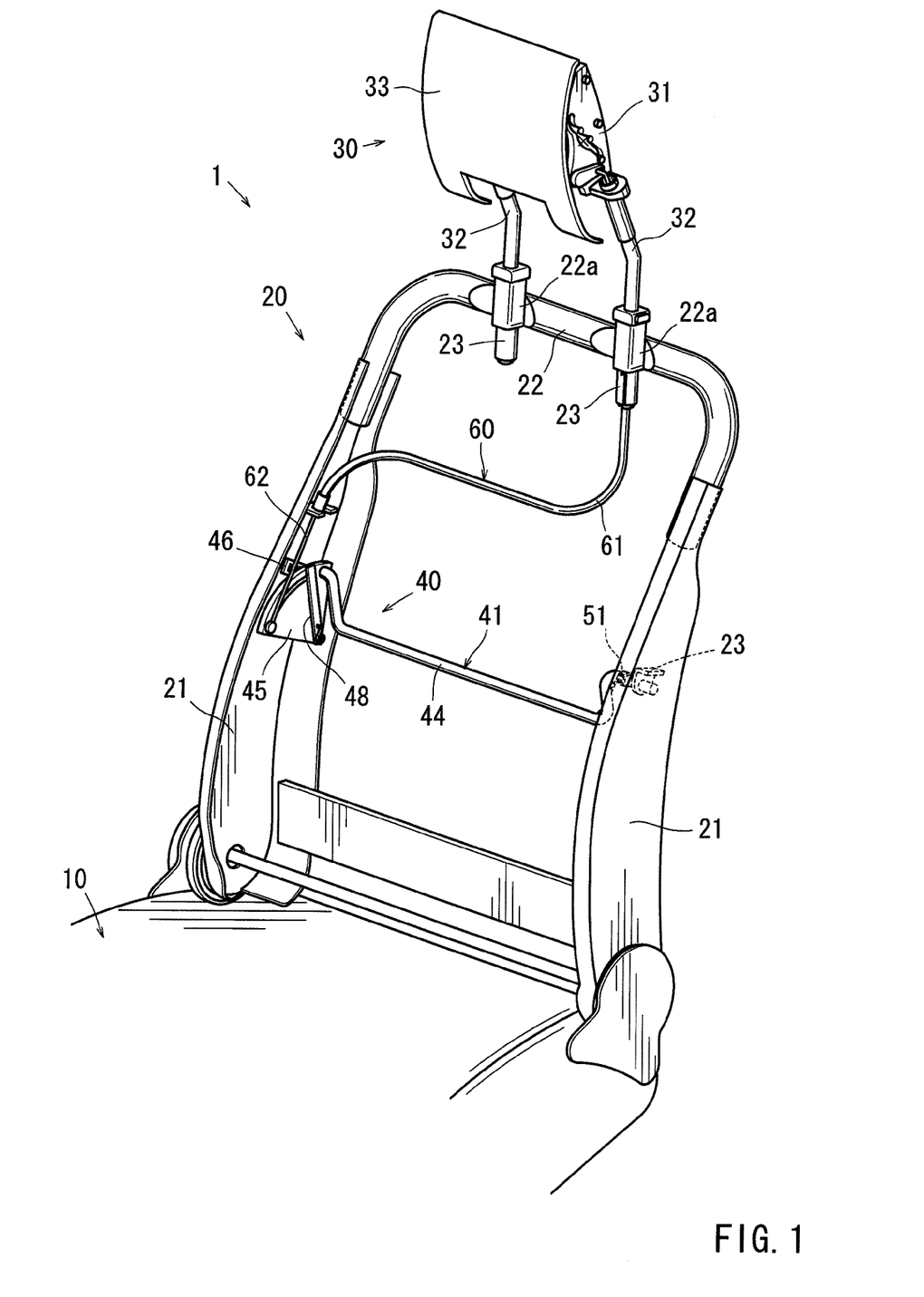
FIG. 1 is a perspective view of a vehicle seat having a clutch mechanism of the present invention.

First, a general structure of a vehicle seat 1 having a clutch mechanism 40 of the present invention will be described. As shown in FIG. 1, the vehicle seat 1 is constructed of a seat cushion 10 on which a passenger is capable of sitting, a seat back 20 supporting the back of the sitting passenger, and a headrest 30 supporting the back of a head of the sitting passenger.

A frame structure of the seat back 20 will be described in detail. The frame structure of the seat back 20 is composed of a pair of right and left side frames 21 and an upper frame 22 bridging upper portions of the side frames 21. Lower portions of the side frames 21 are tiltably connected to a rear end portion of the seat cushion 10 via reclining mechanisms. A pair of widthwise right and left holders 22a are attached to the upper frame 22. Supports 23 can be inserted into and secured to the holders 22a. Further, stays 32 of the headrest 30 described below can be inserted into and secured to the supports 23, so that the headrest 30 can be attached to the seat back 20.

Figure 2:
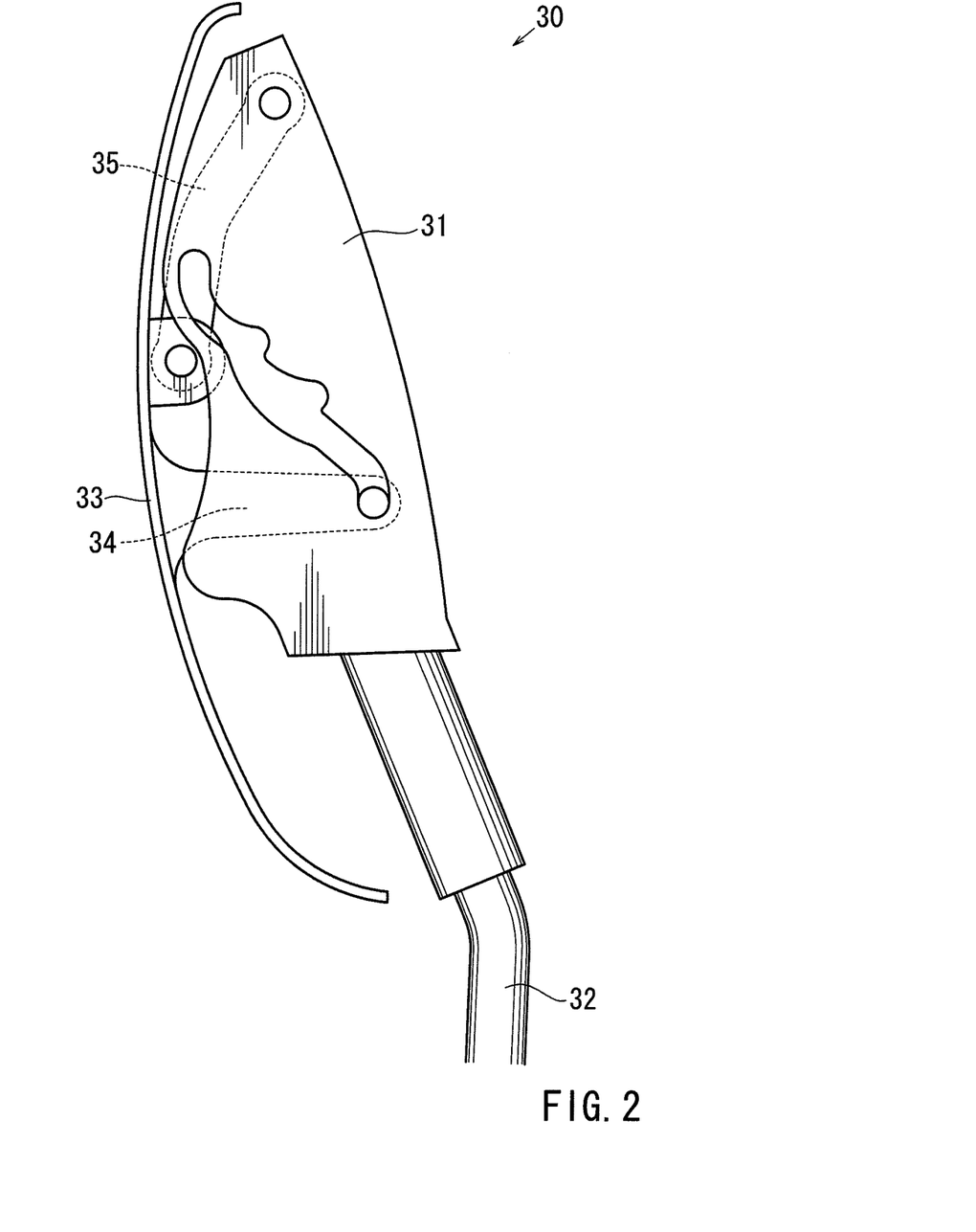
FIG. 2 is a side view of a head rest of the vehicle seat of shown in FIG. 1, illustrating a condition in which a head rest plate is in a normal position.
Figure 3:
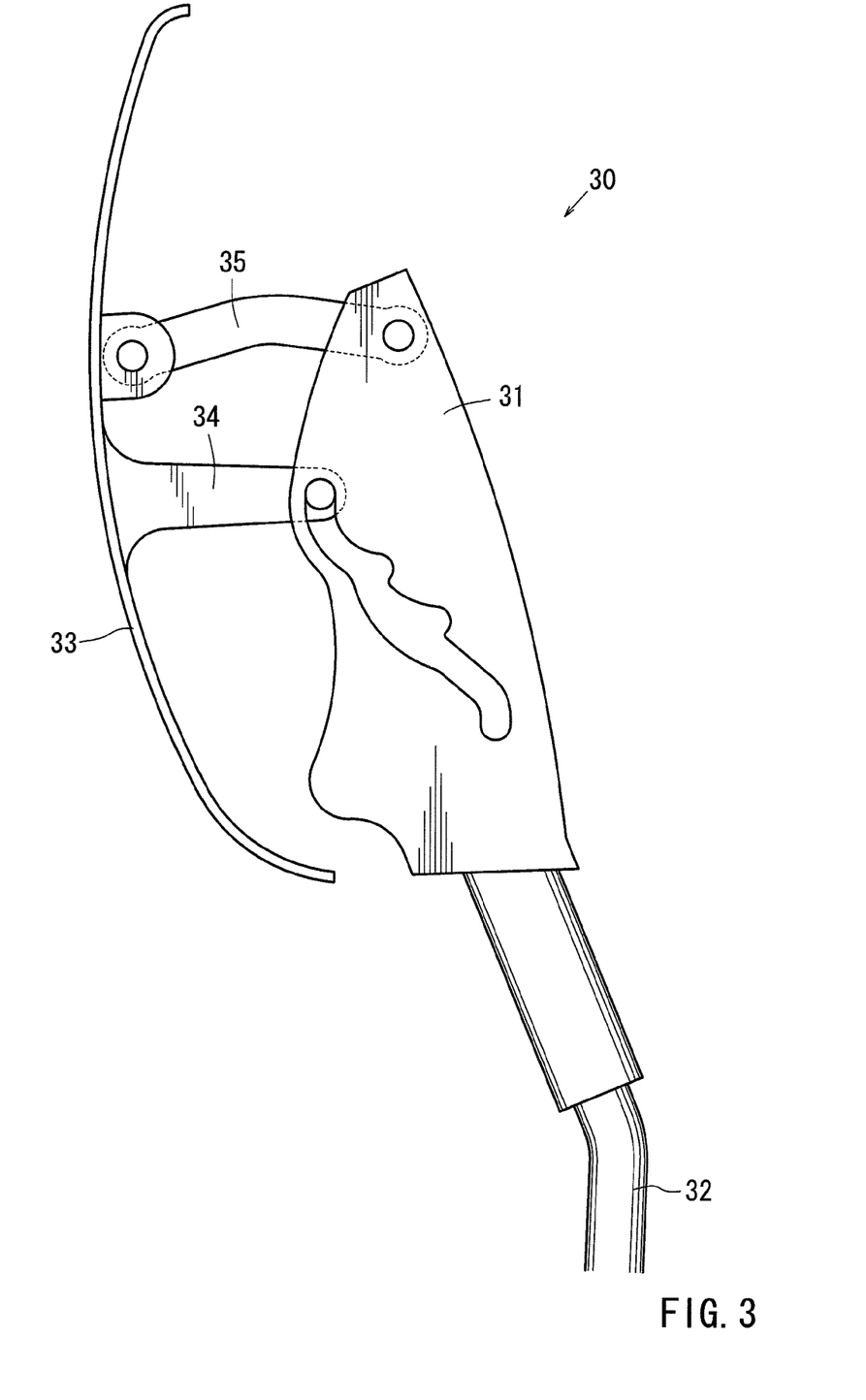
FIG. 3 is a view similar to FIG. 2, illustrating a condition when a back-side collision happens.

A frame structure of the headrest 30 will be described in detail. The frame structure of the headrest 30 is composed of a base portion 31 that constitutes a contour of the headrest 30, a pair of right and left stays 32 that are integrally connected to the base portion 31, and a plate-shaped support plate 33 that covers a front surface of the base portion 31 and supports the back of the head of the passenger sitting on the seat cushion 10. In a normal condition in which a vehicle is not yet subjected to a rear-end collision (which will be referred to as "a back-side collision") by another vehicle, the support plate 33 is retained so as to be substantially integral with the base portion 31 (FIG. 2). Conversely, when the back-side collision of the vehicle happens, the support plate 33 can be projected forwardly with respect to the base portion 31 (FIG. 3). Further, the support plate 33 is attached to the base portion 31 via a support member 34 and a connection link 35.

A projecting mechanism of the support plate 33 can be constructed of a biasing means and a lock mechanism (not shown). When the back-side collision of the vehicle happens, the lock mechanism is unlocked. Therefore, the support plate 33 can be projected forwardly with respect to the base portion 31 due to a biasing force of the biasing means. According to the projecting mechanism, even when the back-side collision of the vehicle happens, the support plate 33 can instantaneously support the back of the head of the passenger. Further, because the frame structure of the seat back 20 and the frame structure of the headrest 30 described above are known structures, a further detailed description thereof will be omitted.

Figure 4:
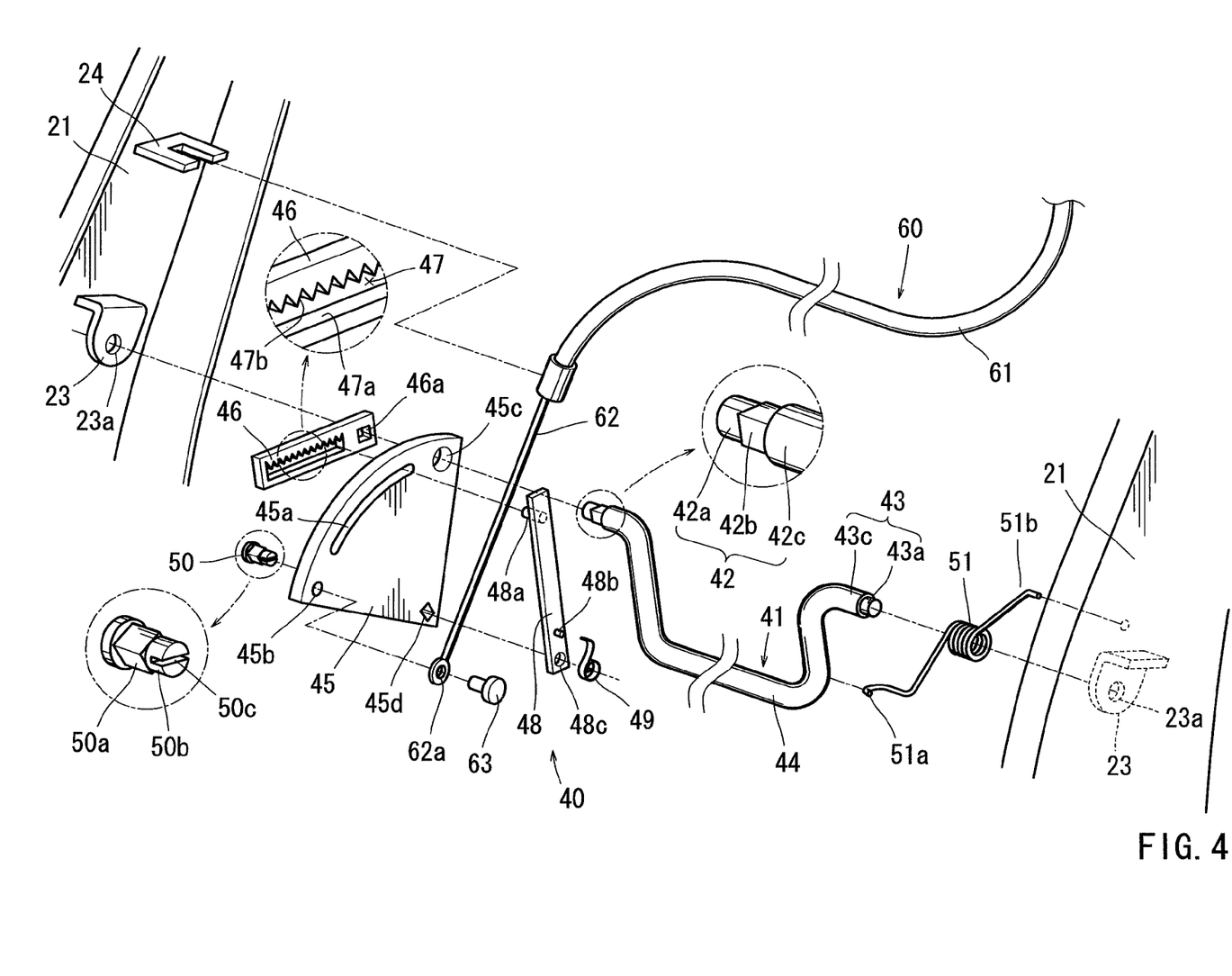
FIG. 4 is an exploded perspective view of the clutch mechanism.
Figure 5:
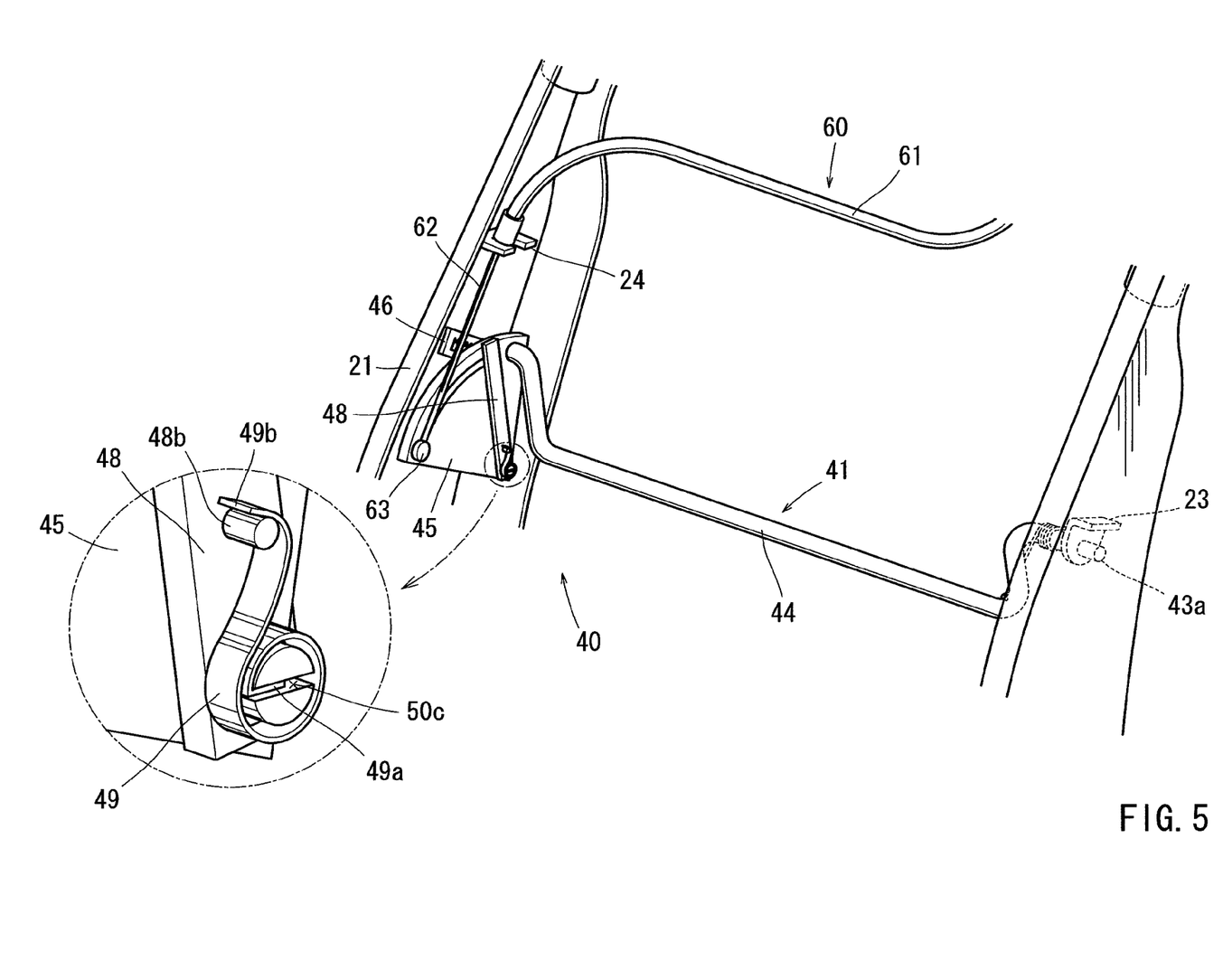
FIG. 5 is a perspective view of the clutch mechanism shown in FIG. 4 when it is assembled.

Next, the clutch mechanism 40 of the present invention will be described. As shown in FIGS. 4 and 5, the clutch mechanism 40 is constructed of a pressure receiving member 41, an operation bracket 45, an arm 46 and a pendulum member 48. In the following, these components will be individually described.

First, the pressure receiving member 41 will be described. The pressure receiving member 41 is a bar-like member that is partially cranked. One end portion 42 (the left end portion in FIGS. 4 and 5) of the pressure receiving member 41 is shaped to have a thin round shaft 42a, a square shaft 42b and a thick round shaft 42c that are positioned in this order from a terminal end thereof. To the contrary, the other end portion 43 (the right end portion in FIGS. 4 and 5) of the pressure receiving member 41 is shaped to have a thin round shaft 43a and a thick round shaft 43c that are positioned in this order from a terminal end thereof. The thick round shaft 42c of the end portion 42 is inserted into an insertion hole 45c of the operation bracket 45 described below, and the square shaft 42b is inserted into an insertion hole 46a of the arm 46 described below. Further, the thick round shaft 43c of the end portion 43 is inserted into a torsion spring 51. In this condition, the thin round shafts 42a and 43a of the end portions 42 and 43 are respectively inserted into insertion holes 23a of pedestals 23 that are formed in inner surfaces of the side frames 21.

As a result, the pressure receiving member 41 is attached to the side frames 21 so as to be rotatable about rotation axes extending in a widthwise direction while the operation bracket 45 is pivotally connected thereto and while the arm 46 is integrally connected thereto. At this time, one end 51a of the torsion spring 51 is engaged with the pressure receiving member 41, and the other end 51b thereof is engaged with the side frame 21. Therefore, the pressure receiving member 41 is constantly biased forwardly of the vehicle due to a biasing force of the torsion spring 51.

Thus, a cranked portion or pressure receiving portion 44 of the pressure receiving member 41 constantly contacts a back surface side of a cushion pad P (not shown in FIGS. 1 to 5) of the seat back 20. Therefore, when the passenger sitting on the vehicle seat 1 leans against the seat back 20, the cushion pad is pressed by a pressing load of the passenger. As a result, the pressure receiving portion 44 of the pressure receiving member 41 is rotated rearwardly about axes of the thin round shafts 42a and 43a against the biasing force of the torsion spring 51. Further, as described above, the torsion spring 51 is used to bring the pressure receiving portion 44 of the pressure receiving member 41 into contact with the back surface side of the cushion pad. Therefore, the torsion spring 51 may have a smaller biasing force.

Next, the operation bracket 45 will be described. The operation bracket 45 is a sector-shaped member having a sector surface. As described above, the insertion hole 45c is formed in the sector surface such that the thick round shaft 42c of the pressure receiving member 41 can be inserted thereinto. The insertion hole 45c is positioned adjacent to an intersection of a circular arc and one of straight lines (adjacent to a right corner portion with respect to a center of the sector surface shown in FIG. 4). The thick round shaft 42c of the pressure receiving member 41 is inserted into the insertion hole 45c, so that the operation bracket 45 is attached to the pressure receiving member 41. Thus, the operation bracket 45 is rotatable about the axis of the thick round shaft of the pressure receiving member 41.

Conversely, an engagement hole 45b is formed in the sector surface such that a pin 63 to which one end of an inner member 62 of an operation cable 60 described below is pivotally connected can be inserted thereinto and secured thereto. The engagement hole 45b is positioned adjacent to an intersection of the circular arc and the other of the straight lines (adjacent to a left corner portion with respect to the center of the sector surface shown in FIG. 4). Further, an insertion hole 45d is formed in the sector surface such that a square shaft 50a of a pin 50 to which a proximal end of the pendulum member 48 described below is pivotally connected can be inserted thereinto. The insertion hole 45d is positioned adjacent to an intersection of the straight lines (adjacent to the center of the sector surface shown in FIG. 4). Further, an elongated hole 45a is formed in the sector surface so as to extend along the circular arc.

The operation cable 60 will be described in detail. The operation cable 60 is formed as a double structure and is composed of a flexible tubular outer member 61 and a wire-like inner member 62 inserted into the outer member 61. A lower end of the outer member 61 is connected to a hook 24 formed in the inner surface of one of the side frames 21. A lower end of the inner member 62 is pivotally connected to the operation bracket 45 as described above. As a result, as the operation bracket 45 rotates, the lower end of the inner member 62 is pulled so as to be drawn out of the lower end of the outer member 61. Conversely, an upper end of the inner member 62 is connected to the lock mechanism that is capable of preventing projection of the support plate 33 of the headrest 30 previously described. Thus, upon rotation of the operation bracket 45, the lock mechanism is unlocked, so that the support plate 33 of the headrest 30 can be projected forwardly.

Next, the arm 46 will be described. The arm 46 is a member that is formed as a rectangular thin plate. As described above, the insertion hole 46a into which the square shaft 42b of the pressure receiving member 41 is inserted is formed in one end portion of the arm 46. The square shaft 42b of the pressure receiving member 41 is inserted into the insertion hole 46a, so that the arm 46 is attached to the pressure receiving member 41. As a result, when the pressure receiving member 41 is rotated with respect to the pedestals 23, the arm 46 is capable of rotating integrally with the pressure receiving member 41.

Figure 6:
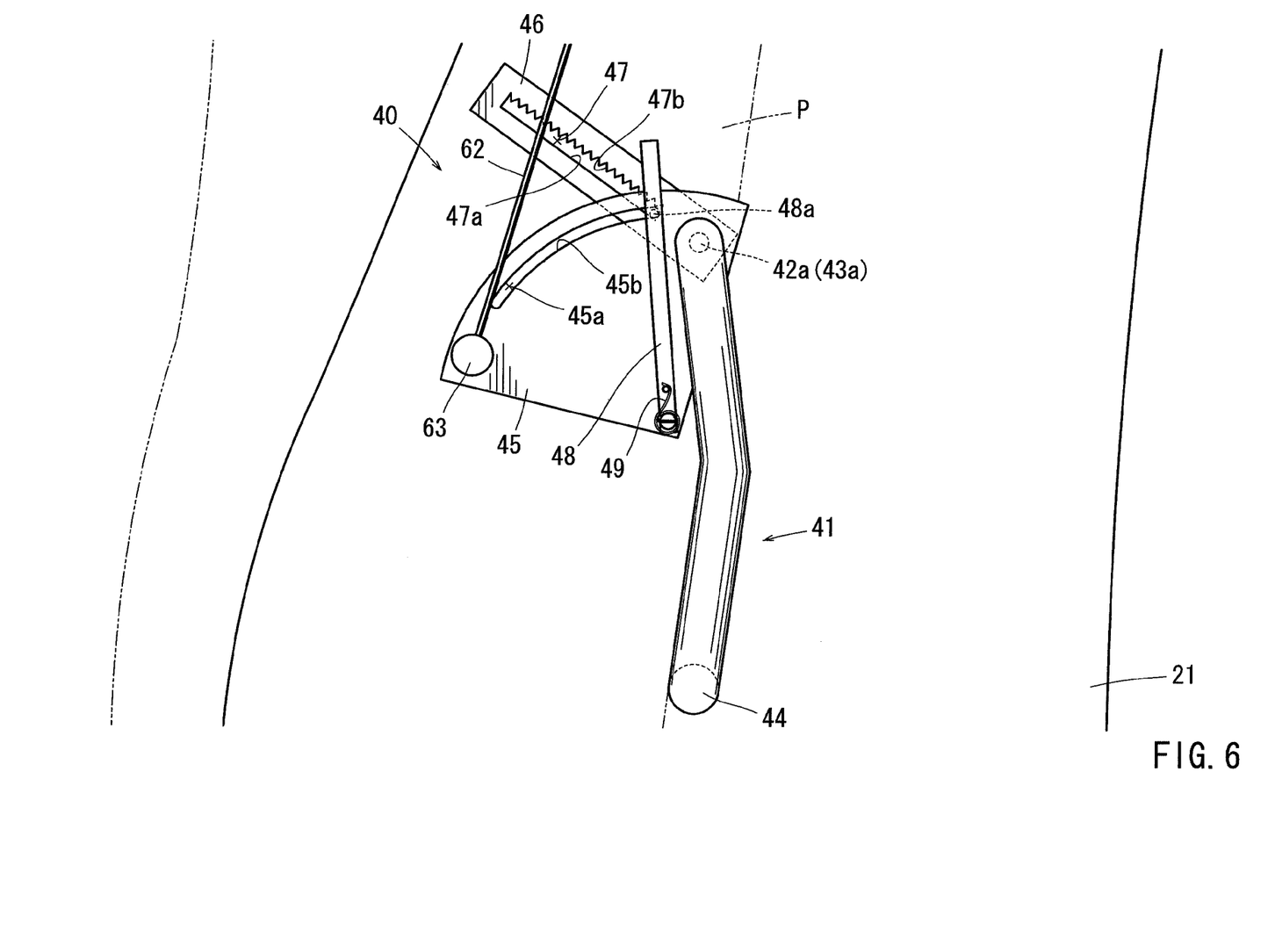
FIG. 6 is an explanatory view illustrating motion of the clutch mechanism of the present invention, which corresponds to a condition in which a passenger does not sit on the vehicle seat.

As shown in FIG. 6, at this time, the arm 46 and the pressure receiving member 41 are integrated with each other so as to have a substantially inverted V-shape in side view (i.e., as seen in the widthwise direction). With reference to FIG. 4 again, the arm 46 has an elongated hole extending in a longitudinal direction thereof. One longitudinal wall surface of the elongated hole 47 (a lower wall surface in FIG. 4) is formed as a flat surface 47a, and the other longitudinal wall surface thereof (an upper wall surface as seen in FIG. 4) is formed as a toothed surface 47b.

Finally, the pendulum member 48 will be described. The pendulum member 48 is a member that is formed as a bar-like thin plate. An engagement hole 48c is formed in one end portion (a proximal end portion) of the pendulum member 48, so that a round shaft 50b of the pin 50 described above can be inserted thereinto and secured thereto. The round shaft 50b of the pin 50 is inserted into and secured to the insertion hole 48c while the square shaft 50a of the pin 50 is inserted into the insertion hole 45d of the operation bracket 45. Thus, the pendulum member 48 is attached to the sector surface of the operation bracket 45, so as to be rotatable about an axis that is perpendicular to the sector surface.

At this time, as shown in FIG. 5, one end 49a of a coil spring 49 is engaged with a cutout groove 50c that is formed in a distal end of the round shaft 50b of the pin 50. Conversely, the other end 49b of the coil spring 49 is engaged with a protrusion 48b that is formed in the pendulum member 48. Further, the protrusion 48b is positioned above the insertion hole 48c. Thus, the pendulum member 48 is attached to the operation bracket 45 while being biased forwardly. Further, a pin 48a is formed in the other end portion (a free end portion) of the pendulum member 48. The pin 48a is inserted into the elongated hole 45a of the operation bracket 45 and the elongated hole 47 of the arm 46, so as to move within the two elongated holes 45a and 47 when the pendulum member 48 rotates.

Next, an operation of the clutch mechanism 40 described above will be described. The clutch mechanism 40 may have various operating conditions which vary in accordance with conditions of the pressing load of the passenger sitting on the vehicle seat 1. Therefore, the operation of the clutch mechanism 40 will be described hereinafter based on the conditions of the pressing load. First, a condition of the clutch mechanism 40 (a condition shown in FIG. 6) before the passenger sits on the vehicle seat 1 will be described.

In the condition shown in FIG. 6, as previously described, the pressure receiving portion 44 is pressed against the back surface side of the cushion pad P because the pressure receiving member 41 is biased forwardly about the thin round shaft 42a (43a). Thus, the pressure receiving portion 44 (the pressure receiving member 41) can receive the pressing load of the passenger. Further, in the condition shown in FIG. 6, the elongated hole 47 of the arm 46 is inclined upwardly forwardly. Therefore, as described above, even when the pendulum member 48 is biased forwardly, the pin 48a formed therein is precluded from moving within the elongated hole 47 of the arm 46. As a result, the pin 48a of the pendulum member 48 can be retained in one ends of the two elongated holes 45a and 47.

In the condition shown in FIG. 6, when the pressure receiving portion 44 receives the pressing load of the passenger, the pressure receiving portion 44 is rotated rearwardly (counterclockwise in FIG. 6) about the thin round shaft 42a (43a). At this time, the arm 46 integrally connected to the pressure receiving portion 44 is also rotated forwardly (counterclockwise in FIG. 6) about the thin round shaft 42a (43a). Thus, inclination of the elongated hole 47 of the arm 46 is reduced downwardly. As a result, the pin 48a of the pendulum member 48 moves in the two elongated holes 45a and 47 from one ends thereof toward the other ends thereof by a biasing force of the coil spring 49.

A case in which the pressure receiving portion 44 receives a quick pressing load will be described. An example of the quick pressing load is the pressing load that can be applied to the seat back 20 via the back of the passenger due to an impact of the back-side collision of the vehicle. When the pressure receiving portion 44 receives the quick pressing load, the arm 46 capable of rotating integrally with the pressure receiving portion 44 rotates at a high speed. At this time, due to the high rotation speed of the arm 46, the pin 48a of the pendulum member 48 engages the toothed surface 47b of the elongated hole 47 of the arm 46 during the movement in the two elongated holes 45 and 47.

Figure 7:
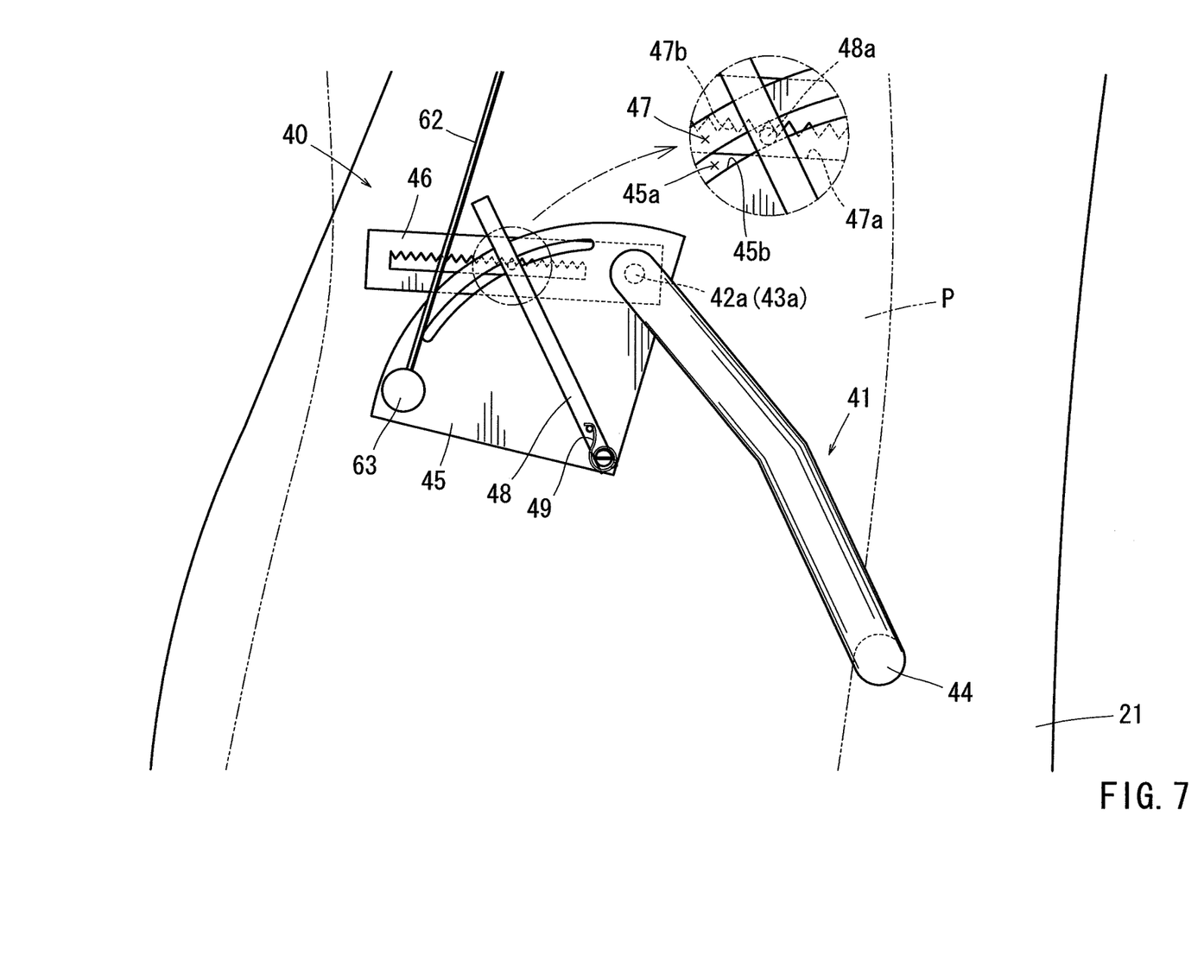
FIG. 7 is a view similar to FIG. 6, which corresponds to an intermediate condition in which a quick pressing load is applied to a pressure receiving portion via the back of the passenger.
Figure 8:
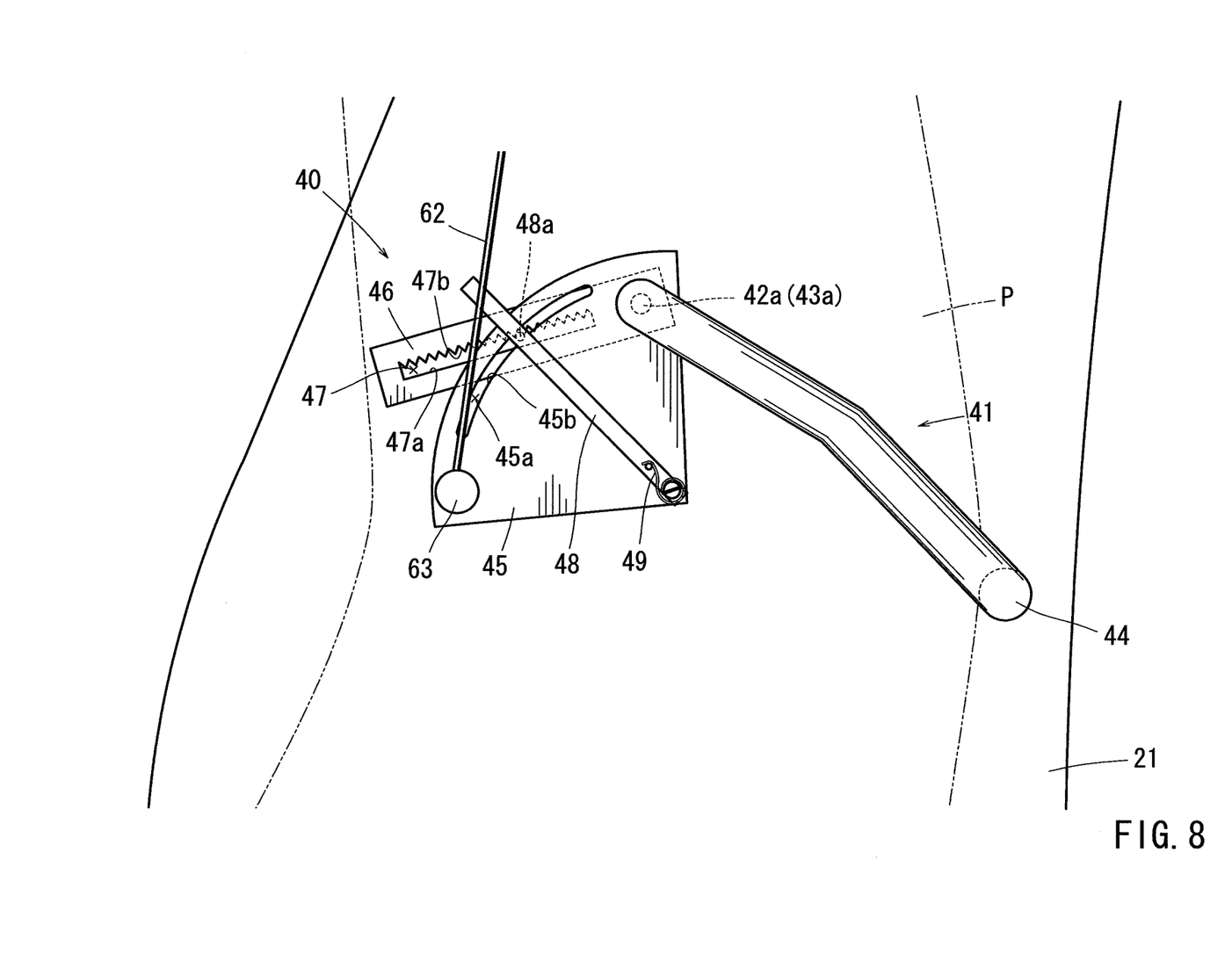
FIG. 8 is a view similar to FIG. 6, which corresponds to a final condition in which the quick pressing load is applied to the pressure receiving portion via the back of the passenger.
Figure 9:
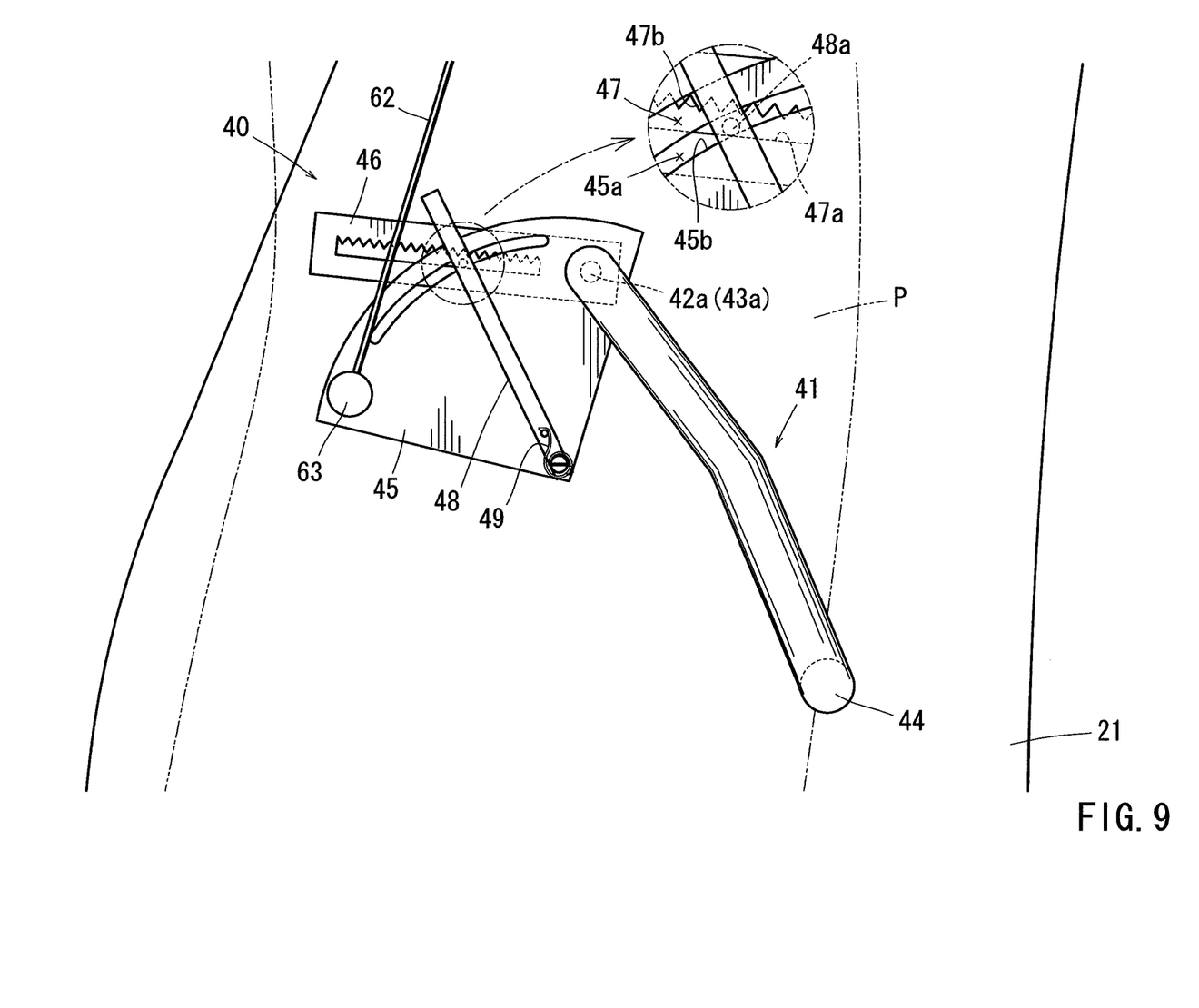
FIG. 9 is a view similar to FIG. 6, which corresponds to an intermediate condition in which a slow pressing load is applied to the pressure receiving portion via the back of the passenger.

As a result of this engagement, a lower outer circumferential surface of the pin 48a is pressed against one wall surface 45b of the elongated hole 45a of the operation bracket 45, so that the operation bracket 45 is immobilized relative to the arm 46 via the pin 48a (a partially enlarged view in FIG. 7). Therefore, when the pressure receiving portion 44 further rotates, the operation bracket 45 rotates about the thin round shaft 42a (43a) together with the arm 46 (FIG. 8). Another way to describe this is that "the pressing load can be transmitted to the operation bracket". Upon rotation of the operation bracket 45, the inner member 62 is pulled downwardly. As a result, as described above, the lock mechanism is unlocked. Thus, the back of the head of the passenger can be instantaneously supported by the support plate 33 that is projected. Therefore, even when the back-side collision of the vehicle happens, the passenger can be prevented from suffering a so-called whiplash injury.

In contrast to the case in which the pressure receiving portion 44 receives the quick pressing load, a case in which it receives a slow pressing load will be described. An example of the slow pressing load is the pressing load that can be applied to the seat back 20 via the back of the passenger due to an impact of getting in and out of the vehicle by the passenger. When the pressure receiving portion 44 receives the slow pressing load, the arm 46 capable of rotating integrally with the pressure receiving portion 44 rotates at a low speed. At this time, due to the low rotation speed of the arm 46, the pin 48a of the pendulum member 48 does not engage the toothed surface 47b of the elongated hole 47 and instead moves toward the other ends of the two elongated holes 45a and 47 while sliding along the flat surface 47a of the elongated hole 47 (a partially enlarged view in FIG. 9).

Figure 10:
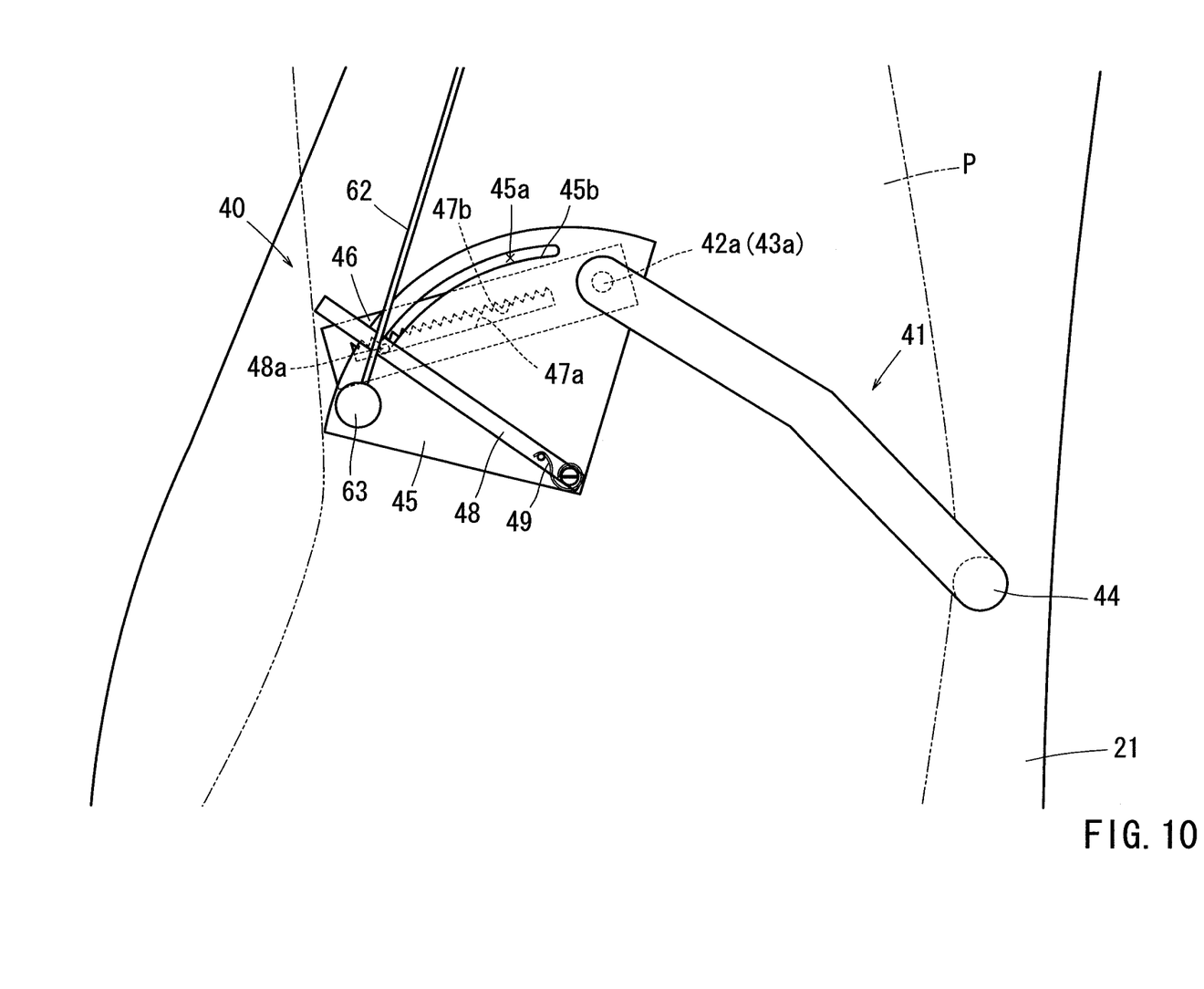
FIG. 10 is a view similar to FIG. 6, which corresponds to a final condition in which the slow pressing load is applied to the pressure receiving portion via the back of the passenger.

Thus, the operation bracket 45 can be prevented from being immobilized relative to the arm 46. Therefore, even when the pressure receiving portion 44 further rotates, the operation bracket 45 does not rotate, and only the arm 46 rotates forwardly (counterclockwise in FIG. 9) about the thin round shaft 42a (43a), so that the pin 48a of the pendulum member 48 can reach the other ends of the two elongated holes 45a and 47 (FIG. 10). Another way to describe this is that "the transmission of the pressing load can be blocked". Thus, the inner member 62 is prevented from being pulled downwardly. As a result, the support plate 33 is not projected.

A moving speed of the pin 48a is determined by the biasing force of the coil spring 49 that biases the pendulum member 48. Therefore, the coil spring 49 must be selected to have a spring constant that permits to operate the above-described clutch mechanism 40.

The clutch mechanism 40 of the present embodiment is constructed as described above. According to this construction, when the pressure receiving portion 44 receives the quick pressing load, the operation bracket 45 is immobilized relative to the arm 46 (that is, the operation bracket 45 and the arm 46 are mechanically integrated with each other). As a result, the pressing load applied to the pressure receiving portion 44 is transmitted to the bracket 46 via the arm 46. Thus, unlike in the prior art, the pressing load can be transmitted to the operation bracket 45 without air. Therefore, the pressing load of the passenger can be reliably transmitted to the operation bracket 45 without being affected by an ambient temperature. Further, in this construction, the clutch mechanism 40 is constructed of the pressure receiving member 41, the operation bracket 45, the arm 46 and the pendulum member 48. Therefore, the clutch mechanism 40 can be simplified.

Further, according to this construction, the pressing load of the passenger can be transmitted to the lock mechanism of the headrest 30 via the clutch mechanism 40. Therefore, when the back-side collision of the vehicle happens, the back of the head of the passenger can be instantaneously supported by the support plate 33 of the headrest 30. Further, according to this construction, the two elongated holes 45a and 47 of the operation arm 45 and the arm 46 can be sufficiently lengthened, if necessary. Therefore, even when the pressing load is changed due to body weight of the passenger sitting on the vehicle seat 1, such changes of the pressing load caused by the body weight of the passenger can be absorbed by the lengthened elongated holes 45a and 47. Thus, the pressing load of the passenger can be reliably transmitted to the operation bracket 45 without being affected by the body weight of the passenger sitting on the vehicle seat 1.

A representative embodiment of the present invention has been described. Therefore, the description should not be construed restrictively. In the embodiment described above, the torsion spring 51 is used to constantly press the pressure receiving portion 44 of the pressure receiving member 41 against the back surface side of the cushion pad P. However, the pressure receiving portion 44 of the pressure receiving member 41 can instead be connected to the back surface side of the cushion pad.

What is claimed is:

1. A clutch mechanism comprising:
a pressure receiving member attached to two side frames of a seat back of a vehicle seat and rotatable about rotation axes extending in a widthwise direction,
wherein when the pressure receiving member is rotated by a pressing load of a passenger sitting on the vehicle seat, the pressing load is selectively transmitted to an operation bracket pivotally connected to the rotation axes such that the operation bracket is rotated in the same direction as the pressure receiving member,
wherein the pressure receiving member is a bar-like member of which a central portion is cranked,
wherein the pressure receiving member includes end portions that are rotatably attached to the two side frames, the end portions functioning as the rotation axes,
wherein an arm is integrally attached to one of the rotation axes so as to extend in a crosswise direction with respect to one of the rotation axes,
wherein the arm has an elongated hole extending in a longitudinal direction, the elongated hole having a first longitudinal wall surface and a second longitudinal wall surface, the first longitudinal wall surface of the elongated hole being formed as a flat surface, and the second longitudinal wall surface thereof being formed as a toothed surface,
wherein the operation bracket is a sector-shaped plate member having a sector surface,
wherein a corner portion of the sector surface is pivotally connected to one of the rotation axes of the pressure receiving member such that the operation bracket is positioned ahead of the pressure receiving member in a seat front-back direction,
wherein a pendulum member is attached to a central portion of the sector surface so as to be rotatable about an axis extending in a direction perpendicular to the sector surface, the endulum member being biased forwardly in the seat front-back direction,
wherein an elongated hole is formed in the sector surface so as to extend along a circular arc thereof,
wherein a pin configured for insertion into the elongated holes of the operation bracket and the arm is formed in a free end portion of the pendulum member,
wherein when the pressure receiving member receives a quick pressing load, the arm rotates together with the pressure receiving member, wherein upon rotation of the arm, the pin of the pendulum member moves from one end of the two elongated holes of the operation bracket and the arm toward the other end thereof, and engages the toothed surface of the arm during the movement, so that the operation bracket is immobilized relative to the arm via the pin, wherein upon immobilization of the operation bracket, the operation bracket is rotatable together with the arm, so that the pressing load is transmitted to the operation bracket, and wherein when the pressure receiving member receives a slow pressing load, the arm rotates together with the pressure receiving member, wherein upon rotation of the arm, the pin of the pendulum member moves from one end of the two elongated holes of the operation bracket and the arm to the other end thereof and as a result, the operation bracket does not rotate, and only the pressure receiving member rotates, so that transmission of the pressing load is blocked.

* * * * *